Aug. 14, 1923.

J. BARABAS 1,464,965

COOKING UTENSIL

Filed Jan. 6, 1923

Inventor
J. Barabas

By
J. F. Bryant.
Attorney

Patented Aug. 14, 1923.

1,464,965

UNITED STATES PATENT OFFICE.

JOSEPH BARABAS, OF ROME, NEW YORK.

COOKING UTENSIL.

Application filed January 6, 1923. Serial No. 611,135.

*To all whom it may concern:*

Be it known that I, JOSEPH BARABAS, a citizen of Hungary, residing at Rome, in the county of Oneida and State of New York, have invented certain new and useful Improvements in Cooking Utensils, of which the following is a specification.

This invention relates to new and useful improvements in cooking utensils.

An important object of the invention is to provide a cooking utensil consisting of an inner and outer vessel with a novel bail or handle for the inner vessel.

A further object of the invention is to provide means for retaining the bail or handle in various positions to adapt the utensil for different uses.

A further object of the invention is to provide a cooking utensil that can be cheaply manufactured and one that is strong and durable.

Other objects and advantages of the invention will be apparent during the course of the following description.

Figure 1:
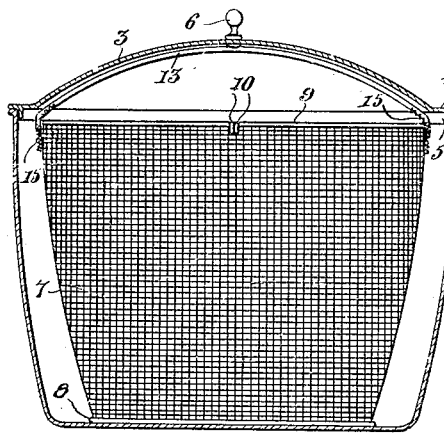
Figure 2:
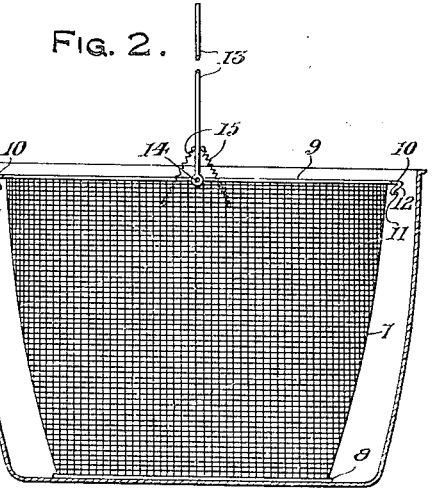
Figure 3:
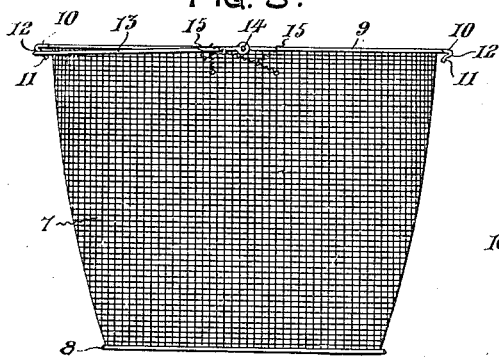
Figure 4:
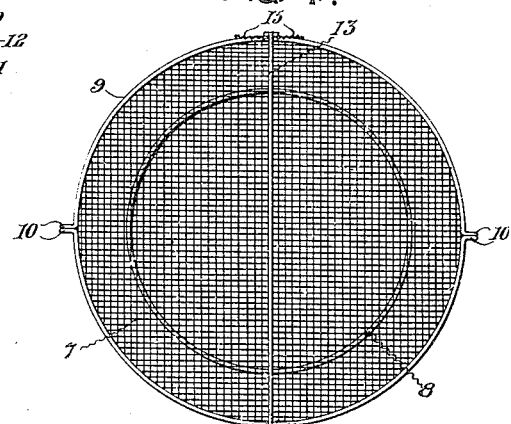
Figure 5:
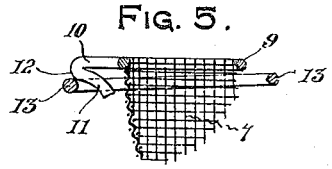
Figure 6:
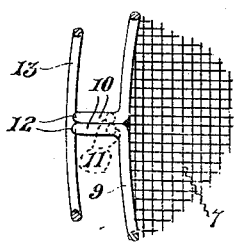
Figure 7:
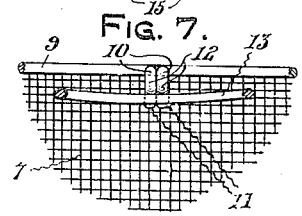

In the accompanying drawing forming a part of this specification and in which like numerals are employed to designate like parts throughout the same, Figure 1 is a vertical sectional view showing the lid of the outer receptacle in place and the position taken by the bail or handle associated with the inner receptacle when the said lid is in the position shown, Figure 2 is a vertical sectional view showing the position of the bail or handle when the cover for the outer vessel is removed, Figure 3 is a side elevational view of the inner vessel and shows the bail or handle secured in a horizontal position for convenience of the user, Figure 4 is a top plan view of the inner vessel, Figure 5 is a fragmentary view of the inner vessel and shows in detail the locking means employed to retain the said bail or handle in its horizontal position, Figure 6 is a top plan view of Fig. 5, and Figure 7 is a fragmentary side elevational view of Fig. 5.

Referring to the accompanying drawing and more particularly to Figs. 1 and 2 there is shown a cooking utensil consisting of an outer vessel with the inner vessel positioned therein. The outer vessel represents a container 1 constructed of any suitable material, preferably metal, and having a beaded or flanged upper edge 2. The upper end of the vessel 1 is adapted to be closed by a cover which consists of the convexo-concave body portion 3 and outwardly directed circumferential flange 4 that is adapted to rest upon the beaded edge 2 of the container 1 and is further provided with a depending circumferential flange 5 that is adapted to fit within the said container for preventing displacement or lateral movement of the said cover. There is also provided a knob 6 that is secured to the body portion of the cover and furnishes suitable means for removing the same.

The inner vessel, as shown in this preferred embodiment of the invention, consists of a strainer that may be employed, as shown in Figs. 1 and 2, in conjunction with the outer container 1, or it may be used separately as suggested in Figs. 3 and 4. The body portion 7 is formed of a wire mesh with a stiffening wire ring 8 at its lower edge and secured thereto in any desired manner. It is to be understood that the bottom of the strainer is formed of similar material to the body portion and may be integrally formed therewith or a separate piece secured to the bottom ring 8. The upper edge of the body portion is secured to the two semi-circular wire members 9 in any well known manner. The adjacent ends of the wire members are adapted to be bent laterally, as shown at 10 and then inwardly upon themselves to form the hook portions 11. It will be seen that this construction forms a shoulder 12 as best shown in Fig. 5, for holding the bail or handle 13 when it is moved into a horizontal position and forced over the outer ends of the laterally bent portions 10. This bail or handle 13 is secured to substantially the center of the semi-circular wire members 9 by suitable pins 14, and is further provided with spring members 15 that are secured thereto above the pivot pins 14 and extend or diverge downwardly to be secured to the body portion 7 at points spaced downwardly and laterally from the pivot pins 14.

In use, when the strainer member is placed within the outer container 1, as shown in Figs. 1 and 2, the bail or handle 13 will be retained in a vertical position by the equalizing springs 15 and upon placing the cover over the open end of the said container the bail or handle will be held in the position shown in Fig. 1 due to the weight of the said cover. However, when the cover is again removed the bail or handle 13 will resume its vertical position by the aid of the stretched spring 15. When it is desired to use the inner vessel or strainer removed from the container 1, the bail or handle may be moved into a horizontal position for affording free access to the interior of the strainer. The bail or handle 13 is retained in its horizontal position by springing the same over the outer ends 10 of the wire members 9 and is held in that position by the shoulder 12 as best shown in Figs. 3, 5, 6 and 7.

It is to be understood that the form of this invention herewith shown and described is to be taken as the preferred example of the same, and that various changes in the size, shape, and arrangement of parts may be resorted to without departing from the spirit of the invention or the scope of the subjoined claims.

Having thus described the invention, I claim:—

1. The combination with an outer vessel consisting of a body portion and a cover for the open end thereof, of an inner vessel, a handle hingedly secured thereto, and springs secured to the handle above its pivot point and diverging downwardly and secured to the inner vessel below said pivot point for vertically positioning the handle when the cover is removed.

2. In a device of the character described, a cooking vessel embodying a body portion, wire members forming the top edge thereof, a handle pivotally secured to said members, springs secured to the handle above its pivot point and diverging downwardly and secured to the body portion below said pivot points for vertically positioning the handle when the cover is removed, and means associated with said members for retaining said handle in a horizontal position when desired.

3. In a device of the character described a cooking vessel embodying a body portion, wire members forming the top edge thereof, a handle pivotally secured to said members, means associated with said handle and body portion for normally retaining the handle in a vertical position, and shoulders formed on the ends of said wire members for retaining said handle in a horizontal position when moved into engagement therewith.

4. In a device of the character described a cooking vessel embodying a body portion, wire members forming the top edge thereof, a handle pivotally secured to said members, springs secured to the handle above its pivot points and diverging downwardly and secured to the body portion below said pivot points for vertically positioning the handle, and shoulders formed on the ends of said wire members for retaining said handle in a horizontal position when moved into engagement therewith.

In testimony whereof I affix my signature.

JOSEPH BARABAS.